Sept. 18, 1956 E. A. FRITZ 2,763,712
WELDED CIRCUIT CONNECTION FOR THERMOELECTRIC
SAFETY DEVICES AND METHOD
Filed Sept. 23, 1950 3 Sheets-Sheet 3
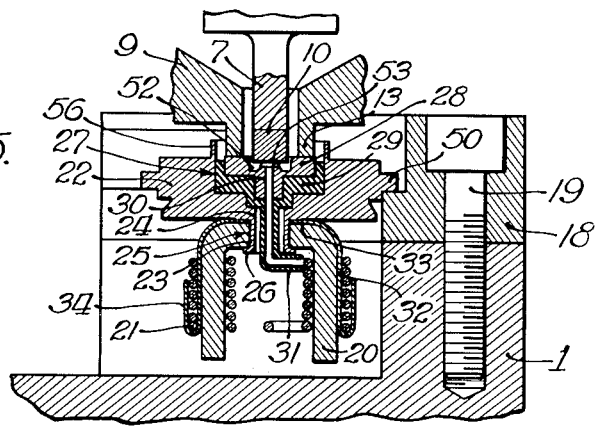
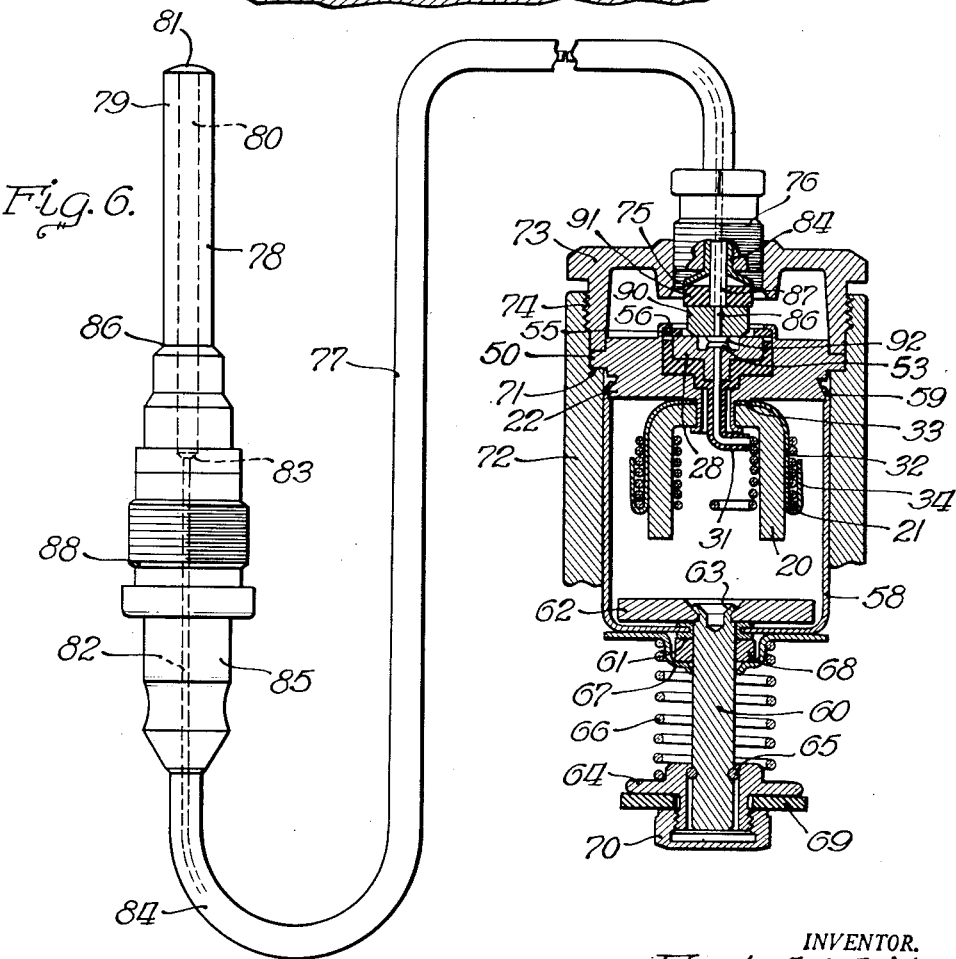
INVENTOR.
*Earl A. Fritz*
BY
*Brown, Jackson, Boettcher & Dienner*
Attys.

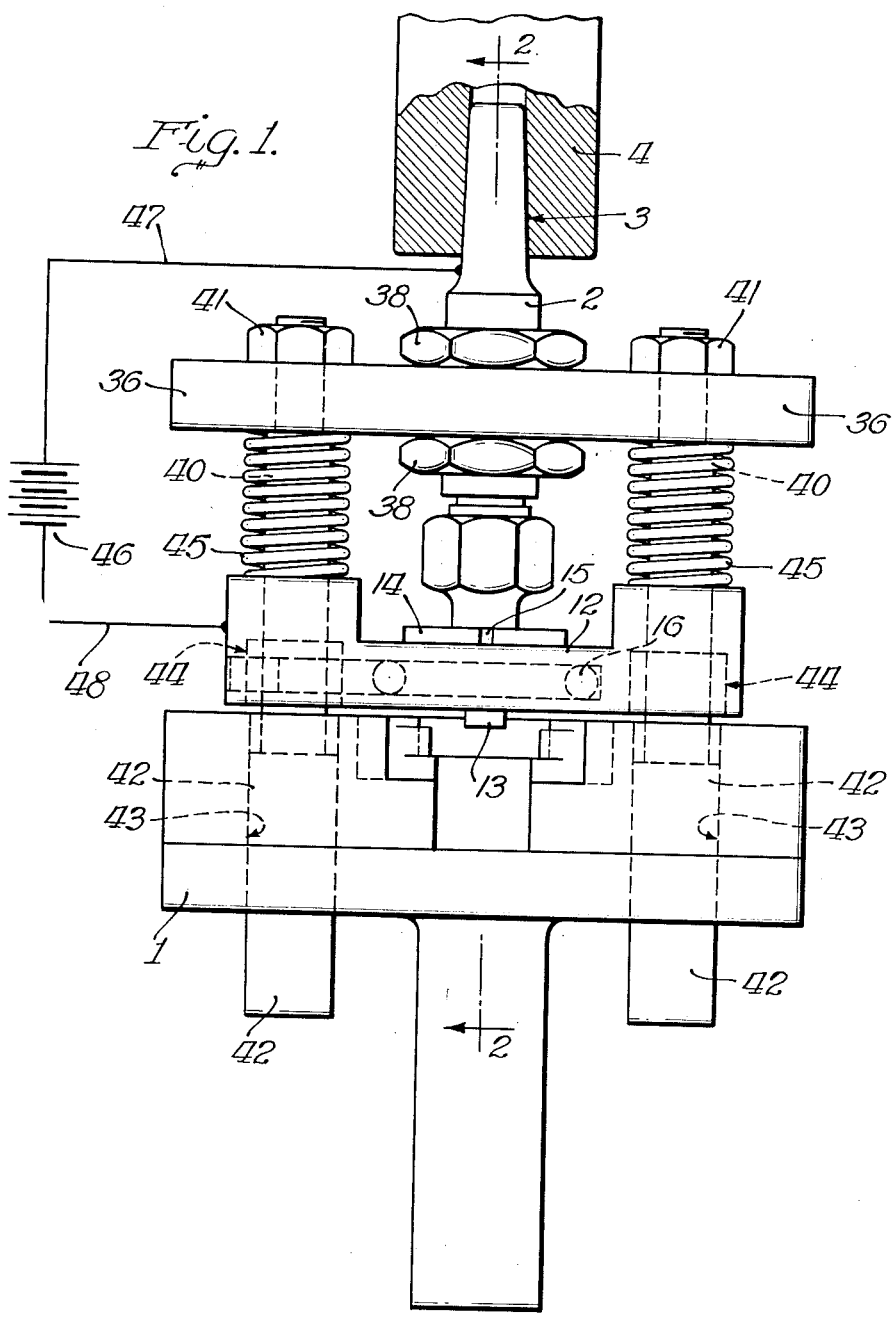

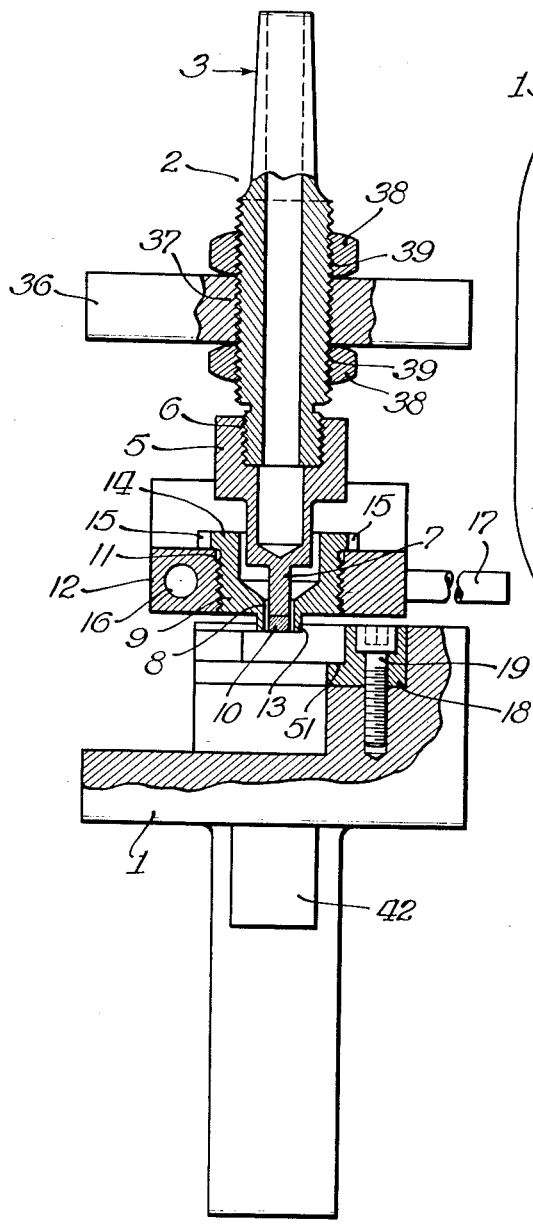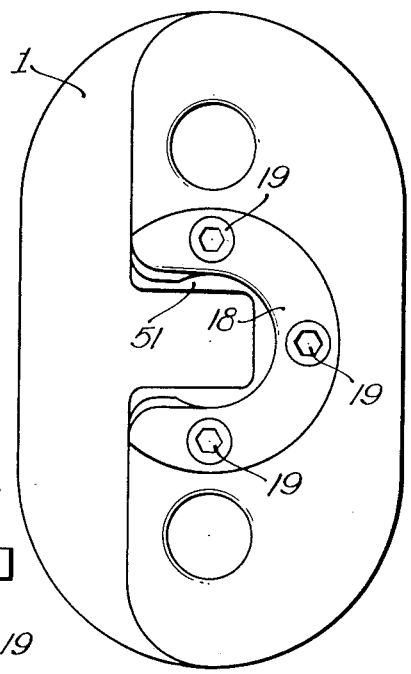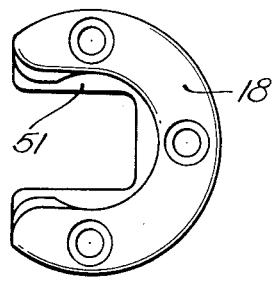

United States Patent Office 2,763,712
Patented Sept. 18, 1956

2,763,712

WELDED CIRCUIT CONNECTION FOR THERMO-ELECTRIC SAFETY DEVICES AND METHOD

Earl A. Fritz, Milwaukee, Wis., assignor to Milwaukee Gas Specialty Company, Milwaukee, Wis., a corporation of Wisconsin Application September 23, 1950, Serial No. 186,390

6 Claims. (Cl. 174—152)

This invention relates, in general, to thermoelectric safety shut-off devices, and has particular relation to an improved welded circuit connection for such devices, and method for the production of same.

In thermoelectric safety shut-off devices it is customary to enclose the magnet frame and coil assembly within a hood and to provide a terminal bushing and a terminal tip for quick detachable connection with an attaching nut or the like, and with a connector.

Heretofore in the art, it has been proposed to form a soldered connection at the terminal tip of the device. This scheme has been objectionable, particularly where packing or insulating sealing means is employed, for example, between the terminal bushing and the terminal tip. The prolonged heating necessary in forming a soldered connection has deleteriously affected the packing or insulating sealing means, and, as a result, the connection has not been as gas-tight as desired.

According to my present invention I provide an improved gas-tight welded circuit connection between the coil wire and the terminal tip by the instantaneous application of heat and pressure.

The chief advantage of the present invention is that the prolonged heating required in forming a soldered connection is unnecessary, and therefore the welded connection may be produced without deleteriously affecting the packing or insulating sealing means, for example between the terminal bushing and the terminal tip. As a result, the welded connection is not only gas-tight and of a character not to loosen where heating of the parts occurs but the packing or insulating sealing means also remains gas-tight and is not loosened or rendered ineffective by forming the welded connection between the coil wire and the thermal tip.

The present invention produces the gas-tight welded circuit connection expeditiously and effectively, and the resulting gas-tight circuit connection is composed of few parts and is simple and reliable, and inexpensive to produce.

Another feature of the invention resides in the provision of a simple and improved welding fixture which may be handled and operated conveniently and effectively to produce the desired gas-tight welded circuit connection.

Further features and advantages and numerous adaptations of the invention will be apparent from the following detailed description, taken in connection with the accompanying drawings.

In the drawings:

Figure 1 is a front elevational view of one form of fixture for welding the coil wire to the terminal tip according to the present invention;

Figure 2 is a vertical sectional view taken on the line 2—2 of Figure 1;

Figure 3 is a top plan view of the work support showing an adapter attached in place thereon;

Figure 4 is a top plan view of the adapter shown in Figure 3;

Figure 5 is a fragmentary vertical section showing the magnet frame, terminal bushing, terminal tip and coil assembly supported on the adapter, and the inner and outer electrodes in welding position; and Figure 6 is a longitudinal axial section through one complete hood assembly embodying the present invention, showing a thermoelectric generator connected in circuit with the coil wire.

Referring now to the drawings, the welding fixture selected for illustration comprises a work supporting member 1 which may be formed of cast brass or other suitable material.

The inner welding electrode is shown as comprising a spindle 2, of copper or other good conducting material, tapered at 3 for engagement in a welding head 4 which has vertical reciprocatory movement. The inner electrode proper designated at 5 is screwed at 6 on the spindle 2. It is preferably formed of a high copper alloy or other suitable conducting material having high strength. The electrode proper 5 has a lower end 7 of reduced diameter which is adapted for reciprocatory movement through an opening 8 in the outer electrode 9. A tungsten tip 10 is preferably brazed on the lower end of the reduced diameter portion 7 of the electrode 5 for the purpose of providing instantaneous high resistance for producing a high temperature at the welding position.

The outer electrode 9 is screwed at 11 into an internally threaded opening in an outer electrode carrying member 12 which may be formed of copper or other suitable conducting material. The electrode 9 has a depending annular neck or lip 13 which constitutes the tip of the outer electrode. The head 14 at the upper end of the electrode 9 has peripheral kerfs 15 for engagement by a suitable tool for screwing the electrode 9 into and out of the member 12.

The member 12 is preferably water-cooled, and for this purpose is provided internally with a duct 16. Water inlet and outlet tubes (one of which is shown at 17 in Figure 2) are provided for circulating cooling water through the duct 16. In this way a high specific conductivity may be maintained for keeping the electrode material below the annealing point.

The work which in the illustrated embodiment of the invention is a magnet frame, terminal bushing, terminal tip and coil assembly, is supported during the welding operation by a generally arcuate or horseshoe-shaped adapter 18 fastened to the support 1, for example, by cap screws 19. The adapter 18 is interchangeable with other adapters for supporting work of other sizes or different configurations.

The magnet frame, terminal bushing, terminal tip and coil assembly selected for illustration comprises a generally U-shaped magnet frame 20 provided with a coil 21 wound around the legs thereof. The metallic or conducting terminal bushing 22 has an integral neck 23 defining an opening in register with an aperture 24 which extends through the bushing 22. The neck 23 extends through an opening 25 in the base of the magnet frame 20 and is spun over at 26 to secure the magnet frame 20 firmly to the bushing 22.

The bushing 22 has a depression 27 at the outer end of the aperture 24, in which a terminal tip 28 of brass or other suitable conducting material is nested. Packing or insulating sealing material 29 is interposed between and electrically insulates the terminal tip 28 from the bushing 22. The packing or insulating sealing material 29 is preferably formed of material which is resistant to gaseous hydrocarbons, so as to form a gas-tight joint between the bushing 22 and the terminal tip 28.

One end of the coil wire 21 extends through the aperture 24 in the bushing and out through a registering aperture 30 in the terminal tip 28, with which latter aperture 30 the coil wire 21 has relatively close fit. The aperture 30 has a conically raised surface adjacent the end of the coil wire 21. The coil wire 21, before welding, extends above the surface approximately 1/32 of an inch. The coil wire 21 is preferably insulated at 31 by a suitable insulating wrapping. The coil 21 may be retained in place by a coil anchoring strip 32 secured at 33 between the bushing 22 and the base of the magnet frame, and folded back at 34 to provide suitable retention for the coil 21.

For the purpose of imparting downward movement to the member 12 and thereby to the outer electrode 9 with the downward movement of the inner electrode 5, there is fixed upon the spindle 2 for rectilinear movement therewith a member 36 which may be formed, for example, of Bakelite or other suitable insulating material. The member 36 has a central opening 37 through which the spindle 2 extends, and the member 36 is secured to the spindle 2 between nuts 38, 38 screwed on the spindle at 39. Pins 40, 40, having reduced ends extending through side openings through the member 36, are secured to the member 36, for example, by nuts 41 screwed upon the upper reduced diameter ends of the pins 40, 40. The pins 40, 40 have lower ends 42, 42 of enlarged diameter guided in openings 43 in the work support 1, and in openings 44 in the member 12. Springs 45 are coiled about the pins 40 and interposed between the member 36 and bosses on the member 12, so that upon downward movement of the member 36 with the spindle 2 the member 12 will be moved downwardly yieldingly through the springs 45, followed by continued downward movement of the spindle 2 and inner electrode 5 relative to the member 12 and outer electrode 9, as will presently appear.

While the use of alternating current is, of course, contemplated within the scope of the present invention, in Figure 1 I have shown more or less diagrammatically at 46 a source of direct current having one side connected by a conductor 47 to the spindle 2 or inner electrode. The other side of current source 46 is connected by a conductor 48 to the member 12, and thereby to the outer electrode 9, the member 12 being preferably formed of copper for good heat conduction. In one embodiment of the invention in actual practice the direct current is obtained by rectifying alternating current from a suitable source of alternating current. Such practice is well known in the art and has not, therefore, been shown in detail except to show the source of current.

In the operation of forming the gas-tight welded circuit connection, the magnet frame 20, terminal bushing 22, packing or insulating sealing means 29, terminal tip 28, and coil 21 are assembled as shown in Figure 5. This assembly is then inserted into the open front of the adapter 18 and into position with the peripheral flange 50 of the bushing 22 seating upon and suspending the magnet assembly from the ledge 51 of the adapter.

The welding mechanism is then set in operation to move the spindle 2 and inner electrode 5 downwardly. The member 36, by its downward movement with the inner electrode, moves the outer electrode 9 downwardly yieldingly through the springs 45. The annular tip 13 of the outer electrode 9 comes into contact with the terminal tip 30, and continued downward movement of the inner electrode 5 permitted by the yielding action of the springs 45 brings the tip 10 of the inner electrode into contact with the upper end of coil wire 21, and thereafter into engagement with the adjacent upstanding conical portion of the terminal tip 28.

As the tip 10 of the inner electrode contacts the work, the electric circuit is completed and an instantaneous current is applied for producing an instantaneous high temperature at the tip of the coil wire 21. Downward pressure is simultaneously applied by the downward force on the inner electrode, and, as a result, a gas-tight welded electric circuit connection is provided quickly and effectively between the coil wire 21 and the terminal tip 28.

The rapidity with which the gas-tight welded circuit connection can thus be produced makes it possible to form the desired gas-tight circuit connection without deleteriously affecting the packing or insulating sealing means 29, as has been the case in forming soldered connections where prolonged heating is required. Moreover, the welded circuit connection is not only gas-tight, but it will not loosen where heating of the parts occurs. The welding of the coil wire 21 directly to the terminal tip 28 also eliminates the necessity for additional terminal studs or the like.

It will be noted that the upper or outer surface of the terminal tip 28 has a smaller annular depression or well 52 surrounding the weld 53 formed between the coil wire 21 and the terminal tip 28. It will also be noted that the force applied in the welding operation is in a direction to compress the packing or sealing means between the terminal bushing 22 and the terminal tip 28.

Upon completing the formation of the gas-tight welded circuit connection between coil wire 21 and terminal tip 28, the magnet assembly, as shown in Figure 5, is removed from the welding fixture. An annular packing or insulating sealing ring 55 is then placed about the outer margin of the outer surface of the terminal tip 28 and the integral annular flange 56 on the terminal tip 28 is bent or spun over against the packing or sealing ring 55 to compress and retain this ring and the packing or sealing material 29 in gas-tight relation between the respective parts of the device. The ring 55 is also preferably formed of insulating material which is resistant to gaseous hydrocarbons.

A magnet hood or cup 58 is applied over the magnet frame 20 and coil 21, and is spun at 59 into engagement with the terminal bushing 22. A stem 60 is mounted for reciprocatory movement through an opening formed by an eyelet 61 in the base of the hood 58. An armature 62 is mounted for relative movement on the inner end of the stem 60 to permit self-accommodation to the pole faces of the magnet frame 20, for example, by extending the reduced inner end of the stem 60 through an opening in the armature 62 and swaging the inner end of the stem at 63.

A valve disc 64 is retained on the outer end of stem 60 by a retaining ring 65, and a coiled spring 66 is interposed between the valve disc 64 and a valve spring seat 67 between which and the adjacent end of the hood 58 packing or sealing means may be interposed at 68 to provide a gas-tight seal. A valve disc gasket 69 is clamped between the valve disc 64 and a valve disc screw 70 screwed on the valve disc 64.

In use, the magnet and cup assemby is mounted, for example, in the control body or on its other form of support by seating the flange 50 of the terminal bushing 22 on a shoulder 71 on the control body or other support 72, and clamping the flange 50 in place by a magnet mounting cup or nut 73 screwed into the support at 74. The cup 73 has an axially disposed internally threaded opening 75 into which the attaching nut 76 of a lead 77 for a thermoelectric generator 78 is adapted to be screwed.

The thermoelectric generator 78 is shown by way of illustration and not by way of limitation as of the general character disclosed and claimed in Oscar J. Leins Patent No. 2,126,564, granted August 9, 1938. It is in the form of a thermocouple comprising an outer tubular metallic thermocouple member 79 and an inner metallic thermocouple member 80 joined at their outer ends to form the thermojunction 81 which is heated by the pilot burner flame or any other desired flame.

The lead 77 comprises an inner lead conductor 82 joined to the inner thermocouple member 80 at 83, to form a cold junction. An outer tubular lead conductor 84 encloses the inner lead conductor and is joined, for example, through a sleeve 85 to the outer thermocouple member 79 to form a cold junction at 86. The inner lead conductor 82 is insulated from the outer lead conductor 84, for example, by a wrapping of insulation 87 on the inner lead conductor. A nut 88 is provided for securing the thermocouple in place, for example, on a bracket for the pilot burner, or on any other suitable support.

Fixed on the opposite end of the inner lead conductor 86 is a conducting connector cone 90 insulated from the adjacent belled out end of the outer lead conductor 84 by an insulator 91. When the attaching nut 76 is screwed into the magnet mounting cup 73, it grounds the adjacent end of the outer lead conductor 84 to the cup 73 and support 72, and clamps the contact 92 at the end of the inner lead 86 in contact with the welded connection at 53, thereby placing the inner lead in circuit with the magnet coil. The other end of the coil wire 21 is connected to the terminal bushing 22, for example, by a resistance weld (not shown), and is thus grounded to the terminal bushing 22 and support 72.

It is to be understood that the thermoelectric generator 78 may be in the form of a thermopile, instead of a thermocouple, within the scope of the present invention.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. A terminal structure for a circuit powered by a source of small electric energy comprising, in combination, a terminal bushing having an aperture opening from the inner side thereof, a terminal tip at the outer side of said bushing and having an aperture opening completely therethrough and in register with the aperture in said bushing, insulating sealing material interposed between said bushing and said tip and insulating said tip from said bushing and sealing the joint therebetween, a lead wire extending out through the aperture in said bushing and through said insulating sealing material and the aperture in said terminal tip and joined at its outer end in direct contact with the outer side of said terminal tip by a joint forming a fluid-tight low resistance electric connection therebetween, an insulating sealing ring positioned against the outer side of said terminal tip, and an annular flange integral with the outer side of said terminal bushing and engaged over said ring and compressing and retaining said ring and said insulating sealing material in fluid-tight relation between the parts of said terminal structure.

2. A fluid tight closure and lead connection member comprising, a bushing having an aperture, a connector tip external to said bushing and also having an aperture, insulating sealing means interposed for sealing the connection between said connector tip and bushing, and a fluid tight seal comprising an electrical conductor brought through said apertures and welded to the external side of said connector tip about the periphery of its said aperture.

3. A fluid tight closure and lead connection member comprising, a bushing having an aperture, a connector tip external to said bushing and also having an aperture, insulating means interposed between said connector tip and bushing, means integral to said bushing for compressing and retaining said insulating means in fluid tight engagement with said connector tip and bushing, and a fluid tight seal comprising an electrical conductor brought through said apertures and welded to the external side of said connector tip about the periphery of its said aperture.

4. An electromagnet assembly comprising, a fluid tight enclosure for an electromagnet comprising, an apertured bushing forming one end wall of the enclosure, a fluid tight seal for said bushing comprising an apertured connector tip external of said bushing, an electrical insulating member interposed therebetween, and an electrical conductor extending through said apertures and welded to said connector tip about the periphery of its said aperture thereby affording low resistance connection between said connector tip and electromagnet, and means integral to said bushing for compressing and retaining said insulating means in fluid tight engagement with said connector tip and bushing.

5. A terminal structure for a circuit powered by a source of small electric energy comprising, in combination, a terminal bushing having an aperture and a flange portion, a terminal tip having an aperture, insulating sealing means interposed between said bushing and said tip, a lead wire disposed in the aperture in said bushing and said terminal tip and forming a fluid-tight low resistance electric connection with the latter, and said flange portion of said terminal bushing being engaged over a portion of said insulating sealing means for retaining the latter in fluid-tight relation between the parts of said terminal structure.

6. A terminal structure for a circuit powered by a source of small electric energy comprising, in combination, a terminal bushing having an aperture, a terminal tip adjacent said bushing and having an aperture opening therethrough, insulating sealing material interposed between said bushing and said tip, a lead wire extending through the aperture in said bushing and through said insulating sealing material and the aperture in said terminal tip and joined at its outer end in direct contact with the outer side of said terminal tip by a joint forming a fluid-tight low resistance electric connection therebetween, an insulating sealing ring positioned against said terminal tip, and a flange associated with said terminal bushing and engaged with and fixing said ring and said insulating sealing material in fluid-tight relation between the parts of said terminal structure.

References Cited in the file of this patent

UNITED STATES PATENTS

| Number | Name | Date |
|---|---|---|
| 1,685,382 | Stuart | Sept. 25, 1928 |
| 1,706,412 | Roberts | Mar. 26, 1929 |
| 1,837,723 | McGraw | Dec. 22, 1931 |
| 2,024,597 | Pfeiffer | Dec. 17, 1935 |
| 2,052,700 | De Lange | Sept. 1, 1936 |
| 2,141,932 | Payne | Dec. 27, 1938 |
| 2,145,276 | Pfanstiehl | Jan. 31, 1939 |
| 2,276,909 | Alfery | Mar. 17, 1942 |
| 2,300,195 | Bennett | Oct. 27, 1942 |
| 2,307,561 | Bailey | Jan. 5, 1943 |
| 2,318,136 | Alfery | May 4, 1943 |
| 2,385,530 | Paille | Sept. 25, 1945 |
| 2,400,364 | Mittermaier | May 14, 1946 |
| 2,503,459 | Thornbery | Apr. 11, 1950 |
| 2,538,609 | Watrous | Jan. 16, 1951 |
| 2,557,130 | McGee et al. | June 19, 1951 |
| 2,566,646 | Whitaker | Sept. 4, 1951 |